US 12,025,896 B2

(12) United States Patent
Adachi

(10) Patent No.: US 12,025,896 B2
(45) Date of Patent: Jul. 2, 2024

(54) DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/312,631

(22) Filed: May 5, 2023

(65) Prior Publication Data

US 2023/0273490 A1    Aug. 31, 2023

Related U.S. Application Data

(63) Continuation of application No. 17/897,694, filed on Aug. 29, 2022, now Pat. No. 11,681,191, which is a continuation of application No. 17/231,616, filed on Apr. 15, 2021, now Pat. No. 11,467,457.

(30) Foreign Application Priority Data

Apr. 17, 2020 (JP) .................... 2020-074094

(51) Int. Cl.
*G02F 1/1362* (2006.01)
(52) U.S. Cl.
CPC .. *G02F 1/136286* (2013.01); *G02F 1/136209* (2013.01)
(58) Field of Classification Search
CPC ................................................ G02F 1/13628
See application file for complete search history.

(56) References Cited

U.S. PATENT DOCUMENTS

| 2014/0111716 | A1* | 4/2014 | Tsao | G02F 1/134363 |
| | | | | 349/123 |
| 2018/0149932 | A1* | 5/2018 | Nakamura | G02F 1/134336 |
| 2019/0212619 | A1 | 7/2019 | Kanehiro et al. | |
| 2020/0241355 | A1* | 7/2020 | Chang | G02F 1/133512 |
| 2020/0365102 | A1* | 11/2020 | Chang | G02F 1/133514 |

FOREIGN PATENT DOCUMENTS

| JP | 2010243875 A | 10/2010 |
| WO | 2018056140 A1 | 3/2018 |

OTHER PUBLICATIONS

Office Action issued on Aug. 30, 2023, in corresponding Chinese Application No. 202110408585.0, 8 pages.

* cited by examiner

*Primary Examiner* — Sang V Nguyen
(74) *Attorney, Agent, or Firm* — Maier & Maier, PLLC

(57) ABSTRACT

A display device includes a first pixel electrode having a first strip electrode and a second strip electrode, a second pixel electrode having a third strip electrode and a fourth strip electrode disposed in the second main pixel, and a light-shielding layer overlapping the first strip electrode. The light-shielding layer has a first opening exposing the second strip electrode, and a second opening exposing the third strip electrode and the fourth strip electrode. A size of the first opening is less than a size of the second opening. A width of the second strip electrode is less than a width of the first strip electrode.

14 Claims, 12 Drawing Sheets

DISPLAY DEVICE

CROSS-REFERENCE TO RELATED APPLICATIONS

This application is a continuation of U.S. patent application Ser. No. 17/897,694, filed Aug. 29, 2022, which is a continuation of U.S. patent application Ser. No. 17/231,616, filed Apr. 15, 2021, which is based upon and claims the benefit of priority from Japanese Patent Application No. 2020-074094, filed Apr. 17, 2020, the entire contents of each of which are incorporated herein by reference.

FIELD

Embodiments described herein relate generally to a display device.

BACKGROUND

Recently, a display device having a round outer shape has been put into practical use. In this display device, the outline of a display region is required to be a shape corresponding to the outer shape of the display device. In this display region, especially when white is displayed, that is, when an image is displayed with a maximum grayscale value, the stepped outline tends to be visually recognized. Therefore, various techniques for smoothly expressing the outline by adjusting the transmittances of pixels along the outline have been proposed.

For example, a technique of adjusting the transmittances by partially light-shielding the pixels has been proposed. However, when a light-shielding layer is patterned, there is a resolution limit, and therefore, there is a limit to the transmittance which can be reduced.

In addition, a technique of adjusting the transmittance by the electrode number of pixel electrodes has been proposed. However, when the shape of the pixel electrode is significantly changed among the pixels in the display region, the pixel capacitance becomes different among the pixels, and display quality may become degraded.

DETAILED DESCRIPTION

Figure 1:
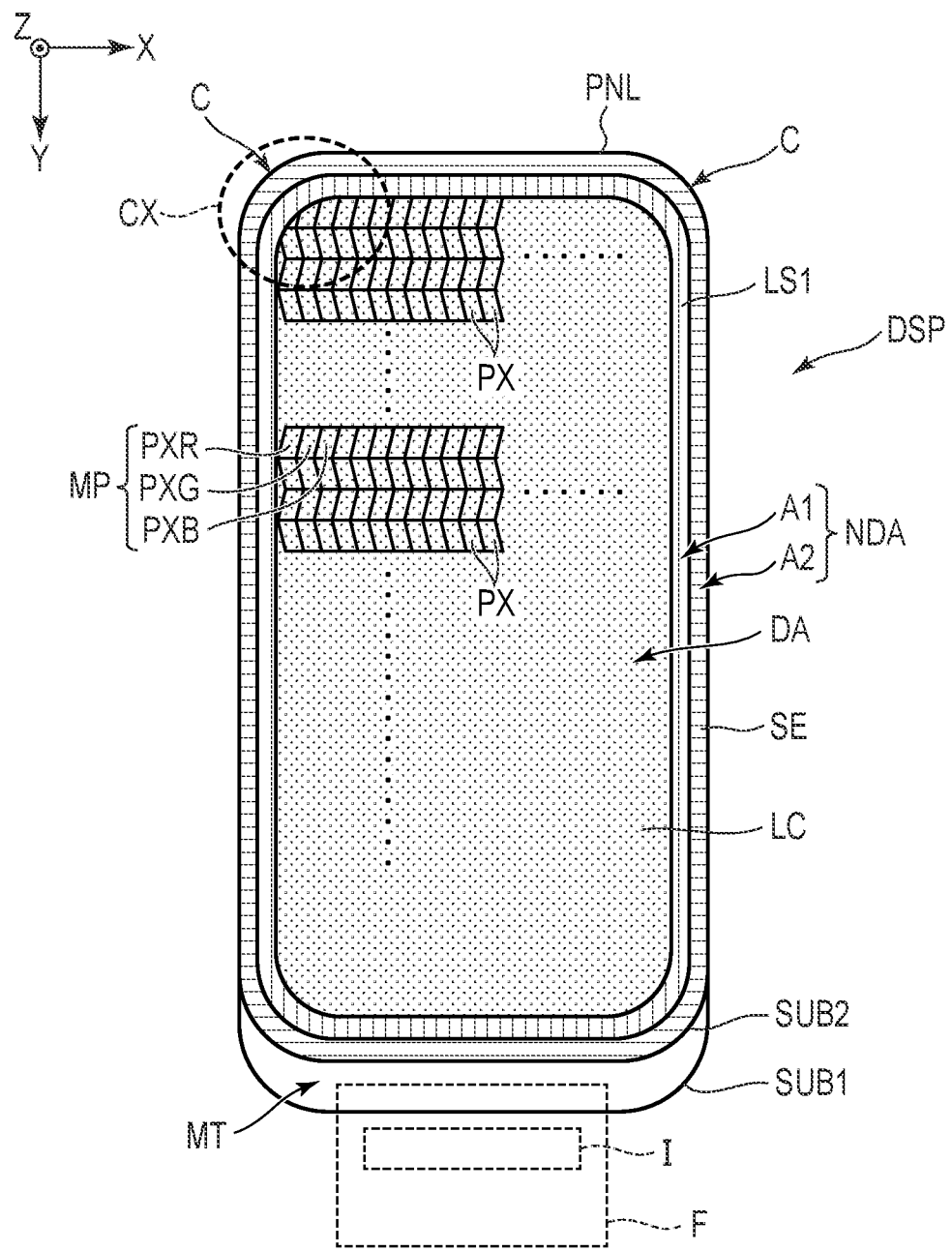
FIG. 1 is a plan view showing a configuration example of a display device DSP of the present embodiment.

In general, according to one embodiment, there is provided a display device comprising: a first substrate comprising a scanning line, a signal line crossing the scanning line, a common electrode disposed over a display region which displays an image, an inorganic insulating film disposed on the common electrode, a first pixel electrode disposed on the inorganic insulating film, disposed in a first main pixel at an outermost periphery of the display region, and having a first strip electrode and a second strip electrode, and a second pixel electrode disposed on the inorganic insulating film, disposed in a second main pixel located more toward an inside than the first main pixel of the display region, and having a third strip electrode and a fourth strip electrode; a second substrate comprising a light-shielding layer overlapping the first strip electrode; and a liquid crystal layer disposed between the first substrate and the second substrate. The first pixel electrode and the second pixel electrode are electrically connected to the same signal line. The light-shielding layer has a first opening which exposes the second strip electrode, and a second opening which exposes the third strip electrode and the fourth strip electrode. A size of the first opening is less than a size of the second opening. A width of the second strip electrode is less than a width of the first strip electrode.

According to another embodiment, there is provided a display device comprising: a first substrate comprising a scanning line, a signal line crossing the scanning line, a common electrode disposed over a display region which displays an image, an inorganic insulating film disposed on the common electrode, a first pixel electrode disposed on the inorganic insulating film, disposed in a first main pixel at an outermost periphery of the display region, and having a first strip electrode and a second strip electrode; a second substrate comprising a light-shielding layer overlapping the first strip electrode; and a liquid crystal layer disposed between the first substrate and the second substrate. The light-shielding layer has a first opening which exposes the second strip electrode. A width of the second strip electrode is less than a width of the first strip electrode.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference signs, and detailed descriptions of them that are considered redundant are omitted unless otherwise necessary.

FIG. 1 is a plan view showing a configuration example of a display device DSP of the present embodiment. In one example, a first direction X, a second direction Y and a third direction Z are orthogonal to one another. However, they may cross one another at an angle other than 90 degrees. The first direction X and the second direction Y correspond to directions parallel to the main surface of a substrate constituting the display device DSP, and the third direction Z corresponds to the thickness direction of the display device DSP. In the present embodiment, viewing an X-Y plane defined by the first direction X and the second direction Y is referred to as planar view.

The display device DSP comprises a display panel PNL. The display panel PNL is, for example, a liquid crystal panel, and comprises a first substrate SUB1, a second substrate SUB2 and a liquid crystal layer LC as a display function layer. The first substrate SUB1 and the second substrate SUB2 are opposed to each other in the third direction Z and are bonded together by a sealant SE. The liquid crystal layer LC is held between the first substrate SUB1 and the second substrate SUB and is sealed in by the sealant SE.

The display panel PNL comprises a display region DA which displays an image and a frame-shaped non-display region NDA which surrounds the display region DA. The non-display region NDA has a region A1 surrounding the display region DA and a region A2 surrounding the region A1. The second substrate SUB2 comprises a peripheral light-shielding layer LS1 disposed in the regions A1 and A2. The sealant SE is disposed in the region A2, and overlaps the peripheral light-shielding layer LS1 in planar view. In FIG. 1, the region A1 shown by vertical lines corresponds to a region in which the peripheral light-shielding layer LS1 and the liquid crystal layer LC overlap each other, and the region A2 shown by horizontal lines corresponds to a region in which the peripheral light-shielding layer LS1 and the sealant SE overlap each other.

In addition, each corner portion C of the display panel PNL is formed in a round shape. Each corner portion of the display region DA is expressed as having a round outline according to the outer shape of the display panel PNL.

The display panel PNL comprises a plurality of pixels PX in the display region DA. The pixels PX are arranged in a matrix in the first direction X and the second direction Y. The pixel PX here indicates a minimum unit which can be individually controlled according to a pixel signal, and may be referred to as a sub-pixel. In addition, a minimum unit of a color image displayed in the display region DA may be referred to as a main pixel MP. The main pixel MP is composed of the pixels PX. For example, the main pixel MP comprises a red pixel PXR which displays red, a blue pixel PXB which displays blue, and a green pixel PXG which displays green. In the example shown in FIG. 1, the red pixel PXR, the green pixel PXG and the blue pixel PXB are arranged in the first direction X. However, they are not limited to this example.

The first substrate SUB1 has a mounting portion MT extending more toward the outside than the second substrate SUB2. A flexible printed circuit board F shown by a dotted line is mounted on the mounting portion MT. An IC chip I shown by a dotted line is mounted on the flexible printed circuit board F. Note that the IC chip I may be mounted on the mounting portion MT.

Note that the display panel PNL may be any of a panel comprising a self-luminous display element such as an organic electroluminescent element, a micro-light-emitting diode (LED) or a mini-LED, a panel comprising an electrophoretic element, a panel employing micro-electromechanical systems (MEMS), a panel employing electrochromism, and the like.

Figure 2:
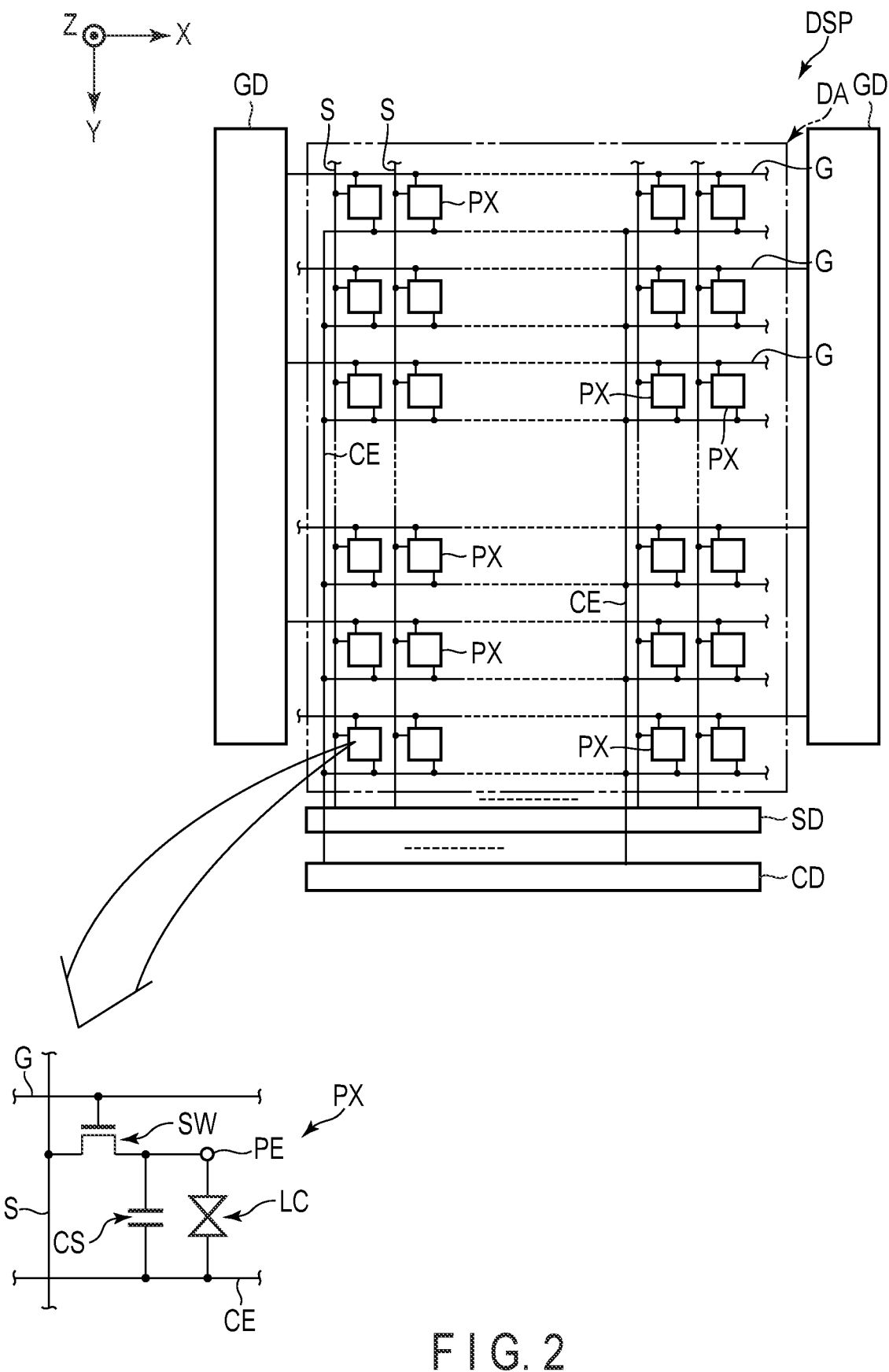
FIG. 2 is an illustration showing the basic configuration and the equivalent circuit of a pixel PX.

FIG. 2 is an illustration showing the basic configuration and the equivalent circuit of the pixel PX.

Each pixel PX comprises a switching element SW, a pixel electrode PE, a common electrode CE, the liquid crystal layer LC and the like. The switching element SW is composed of, for example, a thin-film transistor (TFT), and is electrically connected to a scanning line G and a signal line S.

The scanning lines G each extend in the first direction X, are arranged in the second direction Y, and are connected to a scanning line drive circuit GD. The scanning lines G each are electrically connected to the switching elements SW in the respective pixels PX arranged in the first direction X. The signal lines S each extend in the second direction Y, are arranged in the first direction X, and are connected to a signal line drive circuit SD. The signal lines S each are electrically connected to the switching elements SW in the respective pixels PX arranged in the second direction Y. The scanning lines G and the signal lines S do not necessarily extend straight but may be partially bent. For example, the signal lines S are still assumed to extend in the second direction Y even if they are partially bent. The pixel PX corresponds to a region surrounded by two adjacent scanning lines G and two adjacent signal lines S.

The common electrode CE is disposed over the pixels PX. The common electrode CE is connected to a voltage supply portion CD. The pixel electrode PE is electrically connected to the switching element SW. The pixel electrodes PE each are opposed to the common electrode CE, and drive the liquid crystal layer LC by an electric field produced between themselves and the common electrode CE. A capacitance CS is formed, for example, between an electrode of the same potential as the common electrode CE and an electrode of the same potential as the pixel electrode PE.

Figure 3:
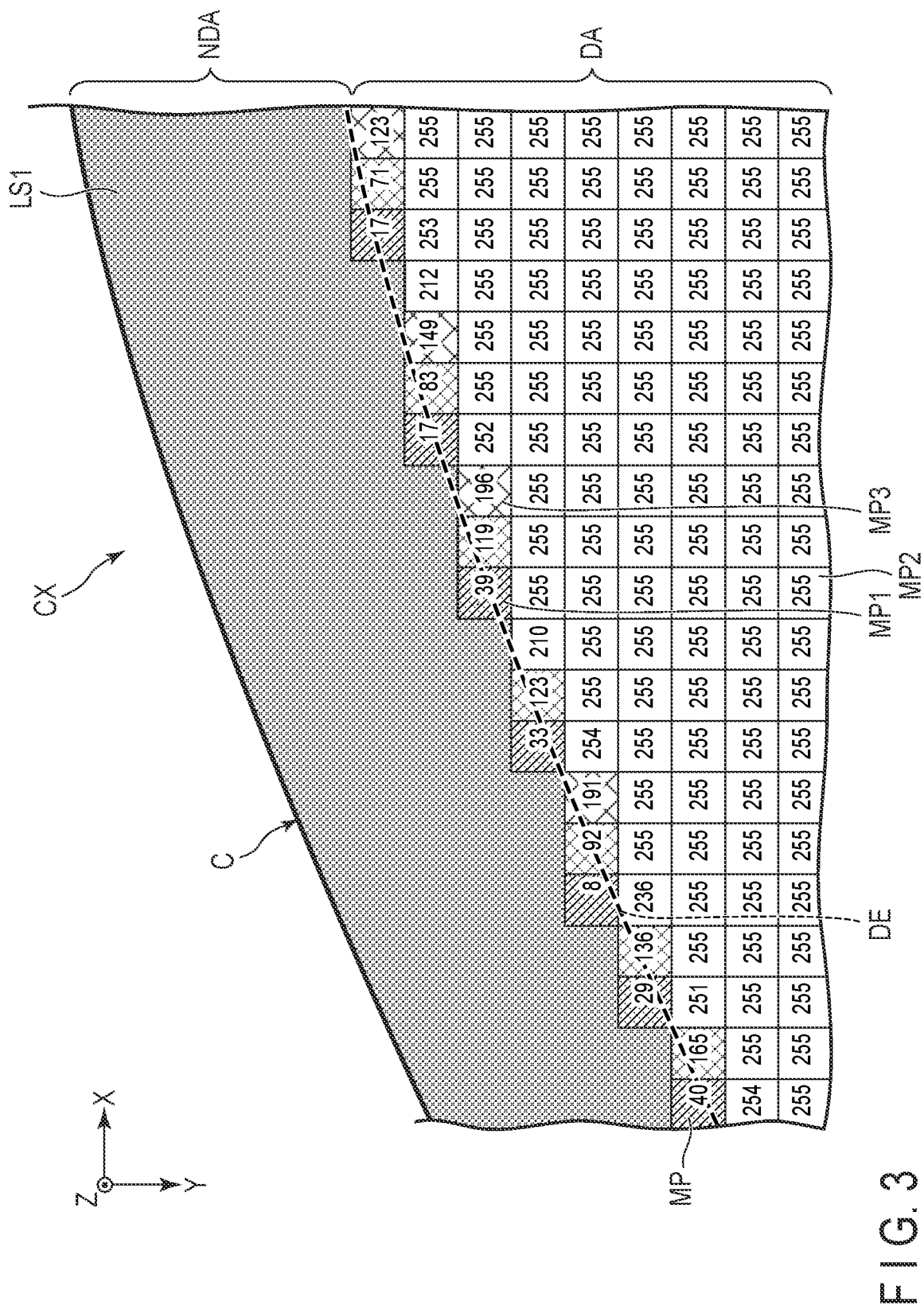
FIG. 3 is an illustration schematically showing a region CX including a corner portion C shown in FIG. 1.

FIG. 3 is an illustration schematically showing a region CX including the corner portion C shown in FIG. 1. In FIG. 3, an ideal outline DE of the display region DA is shown by a dotted line. The outline DE in the region CX is required to be visually recognized as a round shape correspondingly to the corner portion C. The main pixel MP overlapping along the outline DE is adjacent to the peripheral light-shielding layer LS1, and corresponds to an outermost peripheral pixel located at the outermost periphery of the display region DA. In the non-display region NDA, the main pixel MP is not disposed or a dummy pixel which does not substantially contribute to display (or is covered with the peripheral light-shielding layer LS1) is disposed.

The display panel PNL comprises a first main pixel MP1, a second main pixel MP2, a third main pixel MP3 and the like as the main pixels MP. The first main pixel MP1 and the third main pixel MP3 are outermost peripheral pixels, and are disposed in the same row along the first direction X. The second main pixel MP2 is a standard pixel located more toward the inside than the first main pixel MP1 and the third main pixel MP3 of the display region DA. The first main pixel MP1 and the second main pixel MP2 are disposed in the same column along the second direction Y.

In FIG. 3, a number described in the main pixel MP indicates a maximum grayscale value with which an image can be displayed in the main pixel MP. For example, in the second main pixel MP2 which is a standard pixel, 256 levels of grayscale from a grayscale value of zero to a grayscale value of 255 can be expressed, and a maximum grayscale value is 255.

On the other hand, in the first main pixel MP1 which is adjacent to the non-display region NDA or the light-shielding layer LS1 on two sides (or is adjacent to a standard pixel on one side), 40 levels of grayscale from a grayscale value of zero to a grayscale value of 39 can be expressed, and a maximum grayscale value is 39. In addition, in the third main pixel MP3 which is adjacent to the non-display region NDA or the peripheral light-shielding layer LS1 on one side (or is adjacent to a standard pixel on one side or two sides), 197 levels of grayscale from a grayscale value of zero to a grayscale value of 196 can be expressed, and a maximum grayscale value is 196. The maximum grayscale value in the third main pixel MP3 is greater than the maximum grayscale value in the first main pixel MP1.

Note that, also when a main pixel does not overlap the outline DE or does not have any side adjacent to the non-display region NDA or the peripheral light-shielding layer LS1, the maximum grayscale value of the main pixel may be less than the maximum grayscale value of a standard pixel.

As described above, the maximum grayscale values of outermost peripheral pixels including the first main pixel MP1 and the third main pixel MP3 along the outline DE are less than the maximum grayscale value of 255 of standard pixels including the second main pixel MP2. In addition, when white is displayed, that is, when an image is displayed with the maximum grayscale value over the entire region of the display region DA, the outermost peripheral pixels along the outline DE realize gradations. Accordingly, the outline DE can be smoothly expressed, and the display region DA is expressed as having a round outline. In order to express the outline DE more smoothly, the gradations are required to be formed with a broader range of grayscale values. A specific technique for realizing gradations will be described later.

Figure 4:
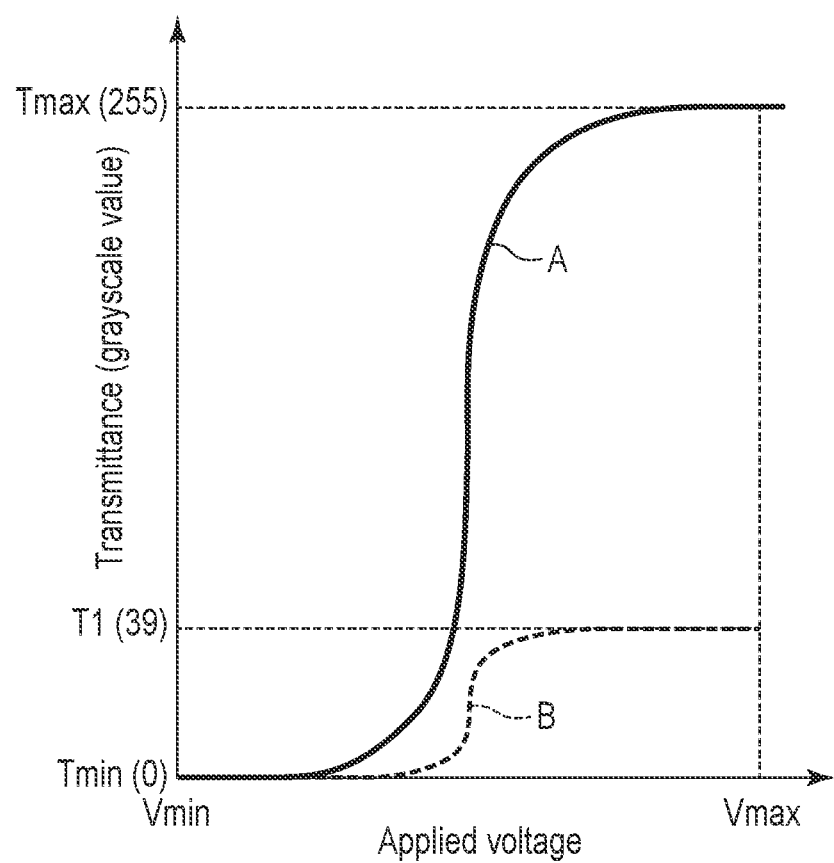
FIG. 4 is an illustration schematically showing the relationship of the transmittance (grayscale value) to the applied voltage of a main pixel MP.

FIG. 4 is an illustration schematically showing the relationship of the transmittance (grayscale value) to the applied voltage of the main pixel MP. The main pixel MP is composed of the sub-pixels PX as described above. Here, the voltage applied to the liquid crystal layer LC in one typical sub-pixel PX constituting the main pixel MP is shown on the horizontal axis, and the transmittance of the sub-pixel PX is shown on the vertical axis.

The relationship between the applied voltage and the transmittance shown in FIG. 4 is referred to as a V-T characteristic. The illustrated V-T characteristic corresponds to a normally black mode in which a minimum transmittance Tmin is obtained with a minimum applied voltage Vmin. The sub-pixel of the second main pixel MP2 which is a standard pixel has a V-T characteristic indicated by A in the drawing. In the V-T characteristic A, an applied voltage with which a maximum transmittance Tmax is realized is referred to as a maximum applied voltage Vmax. A grayscale value of zero is assigned to the minimum transmittance Tmin, a maximum grayscale value of 255 is assigned to the maximum transmittance Tmax, and an intermediate grayscale value is assigned to a transmittance between the minimum transmittance Tmin and the maximum transmittance Tmax.

The sub-pixel of the first main pixel MP1 which is an outermost peripheral pixel has a V-T characteristic indicated by B in the drawing. In the V-T characteristic B, a transmittance T1 when the maximum applied voltage Vmax is applied is less than the maximum transmittance Tmax. For example, the transmittance T1 corresponds to a grayscale value of 39 of the grayscale values of zero to 255 assigned in the V-T characteristic A. That is, when the same maximum applied voltage Vmax is applied to the first main pixel MP1 and the second main pixel MP2, the maximum grayscale value of 39 in the first main pixel MP1 is less than the maximum grayscale value of 255 in the second main pixel MP2.

Figure 5:
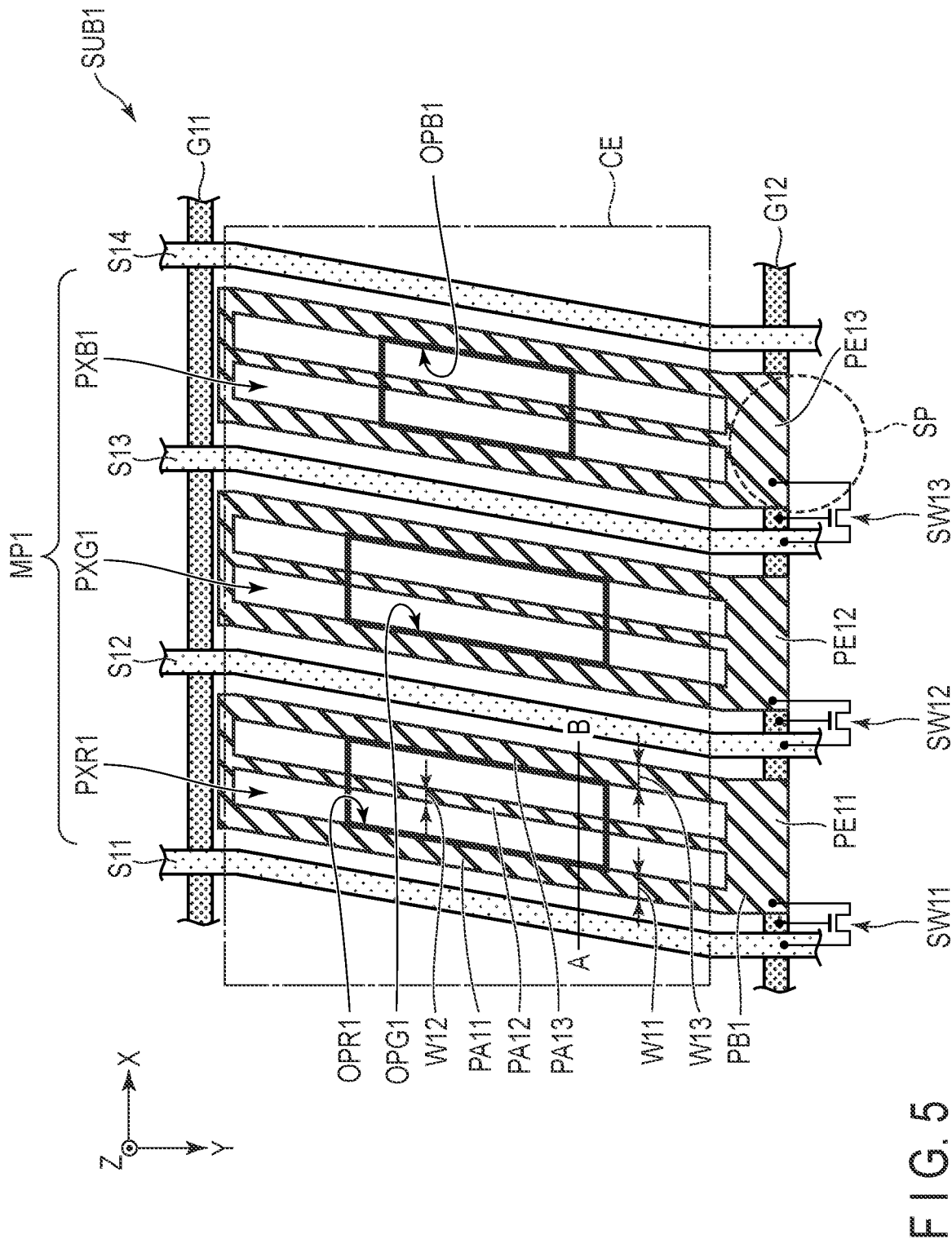
FIG. 5 is a plan view showing a first main pixel MP1.

FIG. 5 is a plan view showing the first main pixel MP1. FIG. 5 shows the first substrate SUB1 employing a fringe field switching (FFS) mode which is one of display modes using a lateral electric field.

The first substrate SUB1 comprises scanning lines G11 and G12, signal lines S11 to S14, switching elements SW11 to SW13, pixel electrodes PE11 to PE13, and a common electrode CE. The common electrode CE is shown by a dashed-dotted line.

The scanning lines G11 and G12 each extend in the first direction X, and are arranged spaced apart from each other in the second direction Y. The signal lines S11 to S14 each extend substantially along the second direction Y, and are arranged spaced apart from one another in the first direction X. The scanning lines G11 and G12 and the signal lines S11 to S14 cross one another.

The first main pixel MP1 comprises a red pixel PXR1, a green pixel PXG1 and a blue pixel PXB1 as sub-pixels. The red pixel PXR1 corresponds to a region surrounded by the scanning lines G11 and G12 and the signal lines S11 and S12. The green pixel PXG1 corresponds to a region surrounded by the scanning lines G11 and G12 and the signal lines S12 and S13. The blue pixel PXB1 corresponds to a region surrounded by the scanning lines G11 and G12 and the signal lines S13 and S14.

The red pixel PXR1 comprises the switching element SW11 electrically connected to the scanning line G12 and the signal line S11, and the pixel electrode PE11 electrically connected to the switching element SW11. The pixel electrode PE11 has a plurality of strip electrodes PA11 to PA13 and a contact portion PB1. The strip electrode PA11 is close to the signal line S11, the strip electrode PA13 is close to the signal line S12, and the strip electrode PA12 is located between the strip electrode PA11 and the strip electrode PA13. The strip electrodes PA11 to PA13 and the contact portion PB1 are integrally formed. The number of strip electrodes provided in one pixel electrode is not limited to three but may be one or two or greater than or equal to four.

A width W12 of the strip electrode PA12 is less than a width W11 of the strip electrode PA11 and a width W13 of the strip electrode PA13. The width W11 of the strip electrode PA11 may be different from or equal to the width W13 of the strip electrode PA13. The widths W11 to W13 each are a length along the first direction X. Here, the pixel electrode PE11 corresponds to a first pixel electrode, the strip electrode PA11 closest to the signal line S11 corresponds to a first strip electrode, and the strip electrode PA12 located at the center of the red pixel PXR1 corresponds to a second strip electrode.

The green pixel PXG1 comprises the switching element SW12 electrically connected to the scanning line G12 and the signal line S12, and the pixel electrode PE12 electrically connected to the switching element SW12.

The blue pixel PXB1 comprises the switching element SW13 electrically connected to the scanning line G12 and the signal line S13, and the pixel electrode PE13 electrically connected to the switching element SW13. The pixel electrodes PE12 and PE13 each have the same shape as the pixel electrode PE11.

The common electrode CE is disposed over the red pixel PXR1, the green pixel PXG1 and the blue pixel PXB1, and overlaps the pixel electrodes PE11 to PE13. The area of the pixel electrode PE11 overlapping the common electrode CE, the area of the pixel electrode PE12 overlapping the common electrode CE, and the area of the pixel electrode PE13 overlapping the common electrode CE are equal to one another.

Figure 6:
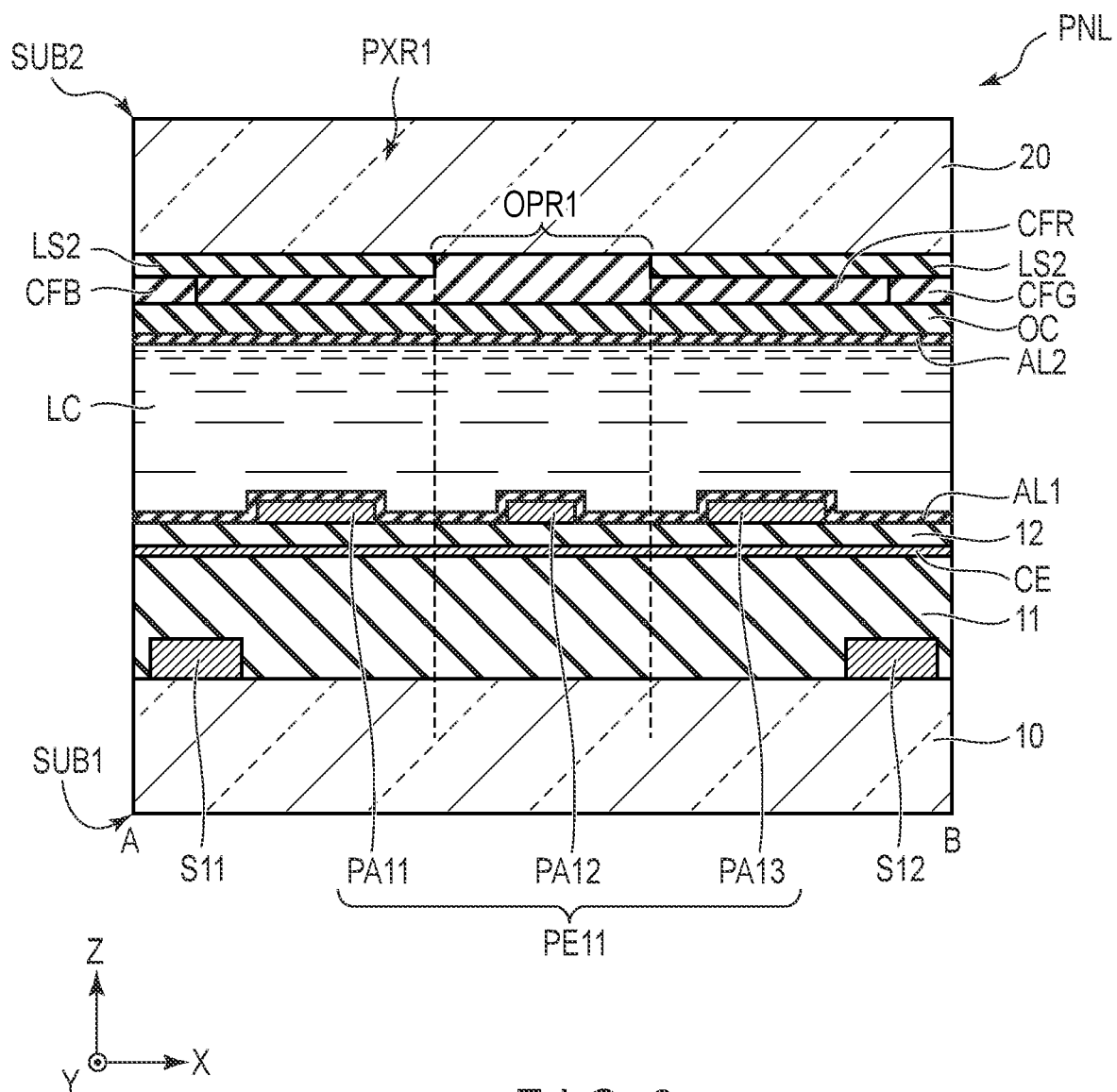
FIG. 6 is a cross-sectional view along line A-B of a display panel PNL including a red pixel PXR1 shown in FIG. 5.

In this first main pixel MP1, a light-shielding layer LS2 shown in FIG. 6 is disposed, and openings formed in the light-shielding layer L2 are shown by solid lines here. In planar view, an opening OPR1 corresponding to the red pixel PXR1 overlaps the pixel electrode PE11, an opening OPG1 corresponding to the green pixel PXG1 overlaps the pixel electrode PE12, and an opening OPB1 corresponding to the blue pixel PXB1 overlaps the pixel electrode PE13. In the example shown in FIG. 5, the size of the opening OPB1 is less than the size of the opening OPR1 and the size of the opening OPG1. The lengths along the first direction X of the openings OPR1, PRG1 and OPB1 are equal to one another. Regarding the lengths along the second direction Y of the openings OPR1, OPG1 and OPB1, the length of the opening OPB1 is less than the length of the opening OPR1 and the length of the opening OPG1. In other words, the area of the blue pixel PXB1 which is light-shielded is greater than the area of the red pixel PXR1 which is light-shielded and the area of the green pixel PXG1 which is light-shielded. Accordingly, a region for disposing a spacer SP shown by a dotted line is formed. The blue pixel PXB1 and the spacer SP are arranged in the second direction Y.

Note that the size of the opening OPB1 may be equal to the size of the opening OPR1.

When attention is focused on the red pixel PXR1, in planar view, the strip electrodes PA11 and PA13 substantially entirely overlap the light-shielding layer, and the strip electrode PA12 is exposed from the opening (first opening) OPR1. In addition, the number of strip electrodes PA12 exposed from the opening OPR1 is one.

FIG. 6 is a cross-sectional view along line A-B of the display panel PNL including the red pixel PXR1 shown in FIG. 5.

The first substrate SUB1 comprises an insulating substrate 10, insulating films 11 and 12, the signal lines S11 and S12, the common electrode CE, the pixel electrode PE11, an alignment film AL1 and the like. Illustrations of layer structures such as scanning lines, semiconductor layers and various insulating films located between the insulating substrate 10 and the signal lines S11 and S12 are omitted.

The insulating film 11 is disposed on the signal lines S11 and S12. The common electrode CE is disposed on the insulating film 11, and is covered with the insulating film 12. The pixel electrode PE11 is disposed on the insulating film 12, and is covered with the alignment film AL1. The insulating film 11 corresponds to an organic insulating film formed of a transparent organic insulating material. The insulating film 12 corresponds to an inorganic insulating film formed of a transparent inorganic insulating material such as silicon nitride, for example. The common electrode CE and the pixel electrode PE11 each correspond to a transparent electrode formed of a transparent conductive material such as indium tin oxide (ITO) or indium zinc oxide (IZO).

The second substrate SUB2 comprises an insulating substrate 20, a light-shielding layer LS2, color filters CFR, CFG and CFB, an overcoat layer OC, an alignment film AL2 and the like. The light-shielding layer LS2 is disposed on a side of the insulating substrate 20 which is opposed to the first substrate SUB1. The light-shielding layer LS2 is integrally formed with the peripheral light-shielding layer LS1 shown in FIG. 1 and the like. In the cross section shown here, the light-shielding layer LS2 is disposed directly above the signal lines S11 and S12, and is disposed directly above the strip electrodes PA11 and PA13 of the pixel electrode PE11, but is not disposed directly above the strip electrode PA12. That is, the light-shielding layer LS2 overlaps the strip electrodes PA11 and PA13, and the opening OPR1 formed in the light-shielding layer LS2 overlaps the strip electrode PA12.

The color filter CFR is disposed in the opening OPR1. In addition, the color filter CFG is similarly disposed in the opening OPG1 shown in FIG. 5, and the color filter CFB is similarly disposed in the opening OPB1 shown in FIG. 5. The overcoat layer OC covers the color filters CFR, CFG and CFB. The alignment film AL2 covers the overcoat layer OC.

The insulating substrates 10 and 20 each are a transparent substrate such as a glass substrate or a resin substrate. The alignment films AL1 and AL2 each are, for example, a horizontal alignment film having an alignment restriction force along the X-Y plane, but each may be a vertical alignment film having an alignment restriction force along the third direction Z.

Figure 7:
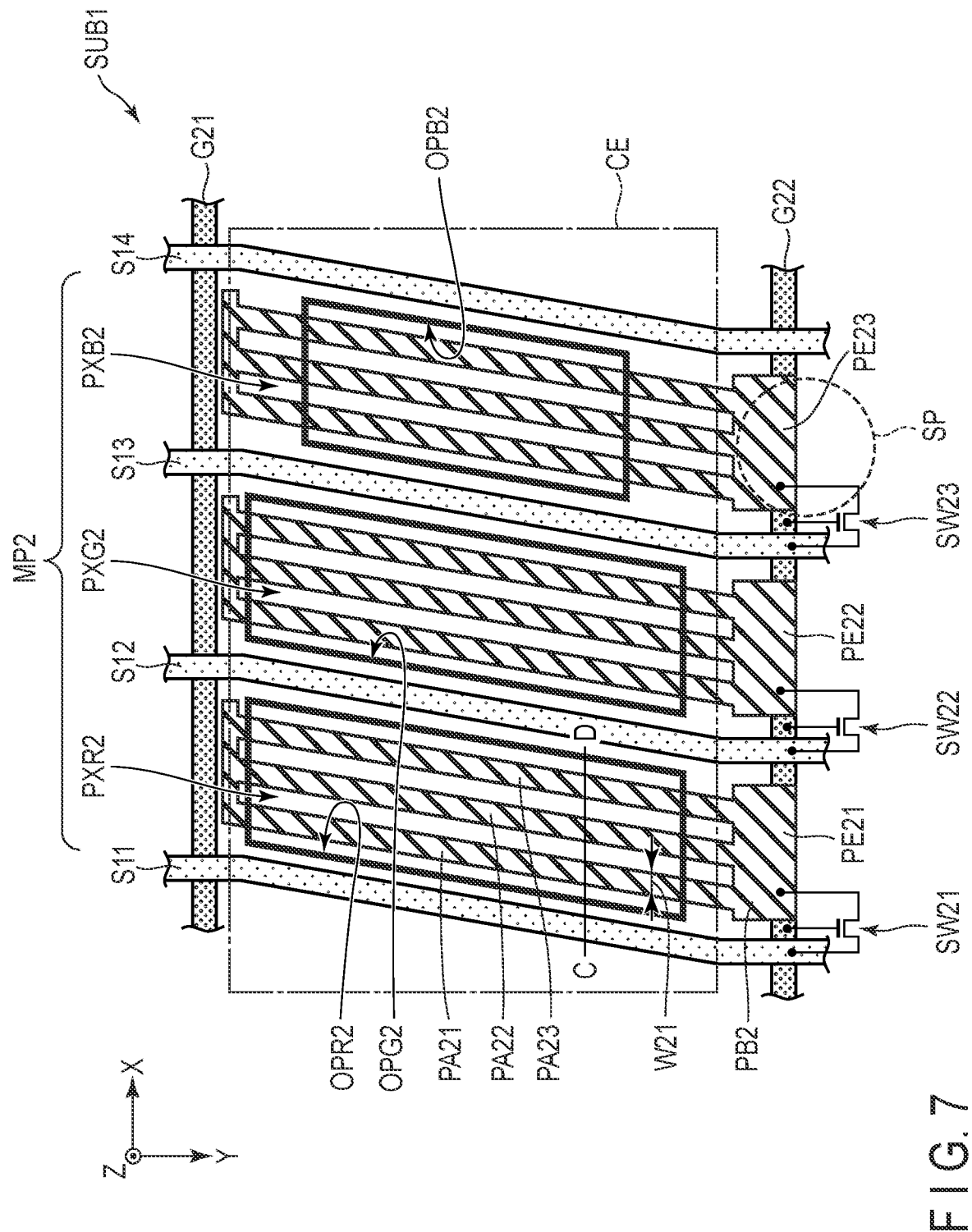
FIG. 7 is a plan view showing a second main pixel MP2.

FIG. 7 is a plan view showing the second main pixel MP2. As described with reference to FIG. 3, the first main pixel MP1 and the second main pixel MP2 are disposed in the same column along the second direction Y, and share the signal lines S11 to S14.

The first substrate SUB1 comprises scanning lines G21 and G22, switching elements SW21 to SW23, pixel electrodes PE21 to PE23, and a common electrode CE. The scanning lines G21 and G22 each extend in the first direction X, and are arranged spaced apart from each other in the second direction Y. The scanning lines G21 and G22 and the signal lines S11 to S14 cross one another.

The second main pixel MP2 comprises a red pixel PXR2, a green pixel PXG2 and a blue pixel PXB2 as sub-pixels. The red pixel PXR2 corresponds to a region surrounded by the scanning lines G21 and G22 and the signal lines S11 and S12. The green pixel PXG2 corresponds to a region surrounded by the scanning lines G21 and G22 and the signal lines S12 and S13. The blue pixel PXB2 corresponds to a region surrounded by the scanning lines G21 and G22 and the signal lines S13 and S14.

The red pixel PXR2 comprises the switching element SW21 electrically connected to the scanning line G22 and the signal line S11, and the pixel electrode PE21 electrically connected to the switching element SW21. That is, the pixel electrode PE11 of the first main pixel MP1 and the pixel electrode PE21 of the second main pixel MP2 are electrically connected to the same signal line S11. The pixel electrode PE21 has a plurality of strip electrodes PA21 to PA23 and a contact portion PB2. The strip electrode PA21 is close to the signal line S11, the strip electrode PA23 is close to the signal line S12, and the strip electrode PA22 is located between the strip electrode PA21 and the strip electrode PA23. The strip electrodes PA21 to PA23 and the contact portion PB2 are integrally formed.

The strip electrodes PA21 to PA23 each have an equal width W21 along the first direction X. The width W21 is less than the width W11 but greater than the width W12 shown in FIG. 5. Here, the pixel electrode PE21 corresponds to a second pixel electrode, the strip electrode PA21 closest to the signal line S11 corresponds to a third strip electrode, and the strip electrode PA22 located at the center of the red pixel PXR2 corresponds to a fourth strip electrode.

The green pixel PXG2 comprises the switching element SW22 electrically connected to the scanning line G22 and the signal line S12, and the pixel electrode PE22 electrically connected to the switching element SW22.

The blue pixel PXB2 comprises the switching element SW23 electrically connected to the scanning line G22 and the signal line S13, and the pixel electrode PE23 electrically connected to the switching element SW23. The pixel electrodes PE22 and PE23 each have the same shape as the pixel electrode PE21.

As shown by a dashed-dotted line, the common electrode CE is disposed over the red pixel PXR2, the green pixel PXG2 and the blue pixel PXB2, and overlaps the pixel electrodes PE21 to PE23. The area of the pixel electrode PE21 overlapping the common electrode CE, the area of the pixel electrode PE22 overlapping the common electrode CE, and the area of the pixel electrode PE23 overlapping the common electrode CE are equal to one another.

In addition, the area of the pixel electrode PE21 overlapping the common electrode CE is equal to the area of the pixel electrode PE11 overlapping the common electrode CE in the first main pixel MP1 shown in FIG. 5.

In this second main pixel MP2, openings formed in the light-shielding layer are shown by solid lines. In planar view, an opening OPR2 corresponding to the red pixel PXR2 overlaps the pixel electrode PE21, an opening OPG2 corresponding to the green pixel PXG2 overlaps the pixel electrode PE22, and an opening OPB2 corresponding to the blue pixel PXB2 overlaps the pixel electrode PE23. In the example shown in FIG. 7, the size of the opening OPB2 is less than the size of the opening OPR2 and the size of the opening OPG2. Note that the size of the opening OPB2 may be equal to the size of the opening OPR2.

The size of the opening (first opening) OPR1 in the first main pixel MP1 shown in FIG. 5 is less than the size of the opening (second opening) OPR2.

In addition, the aspect ratio of the opening OPR1 and the aspect ratio of the opening OPR2 are equal to each other. The aspect ratio here is expressed as the length of the opening along the first direction X/the length of the opening along the second direction Y. That is, the shape of the opening OPR1 is geometrically similar to the shape of the opening OPR2. Similarly, the aspect ratio of the opening OPG1 is equal to the aspect ratio of the opening OPG2, and the aspect ratio of the opening OPB1 is equal to the aspect ratio of the opening OPB2.

When attention is focused on the red pixel PXR2, in planar view, the strip electrodes PA21 to PA23 are exposed from the opening (second opening) OPR2. In addition, the number of strip electrodes exposed form the opening OPR2 is greater than the number of strip electrodes exposed from the opening OPR1.

Figure 8:
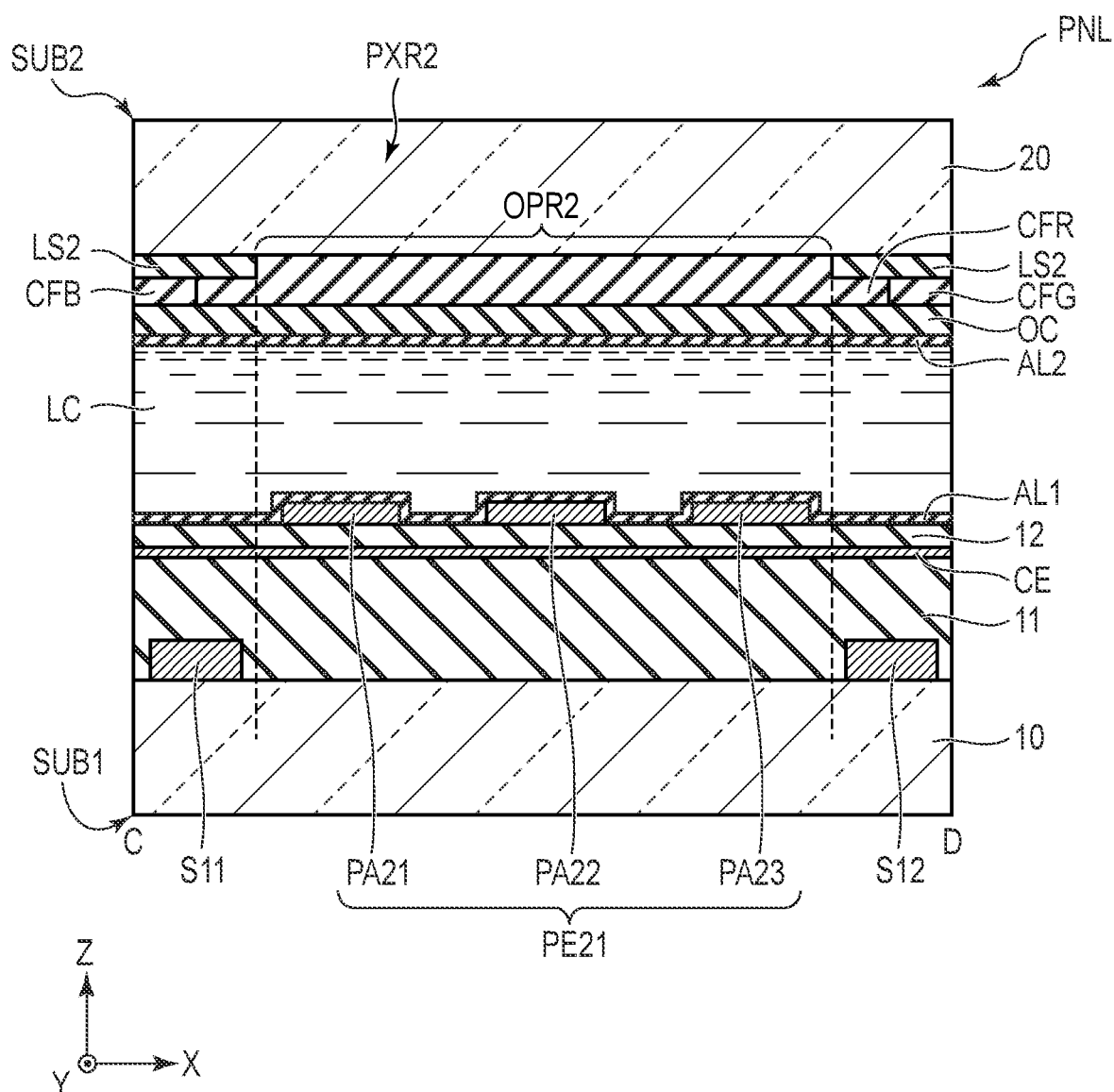
FIG. 8 is a cross-sectional view along line C-D of a display panel PNL including a red pixel PXR2 shown in FIG. 7.

FIG. 8 is a cross-sectional view along line C-D of the display panel PNL including the red pixel PXR2 shown in FIG. 7.

In the first substrate SUB1, the pixel electrode PE21 having the strip electrodes PA21 to PA23 is disposed on the insulating film 12, and is covered with the alignment film AL1.

In the second substrate SUB2, the light-shielding layer LS2 is disposed directly above the signal lines S11 and S12, but is not disposed directly above the strip electrodes PA21 to PA23. That is, the opening OPR2 formed in the light-shielding layer LS2 overlaps all of the strip electrodes PA21 to PA23.

Figure 9:
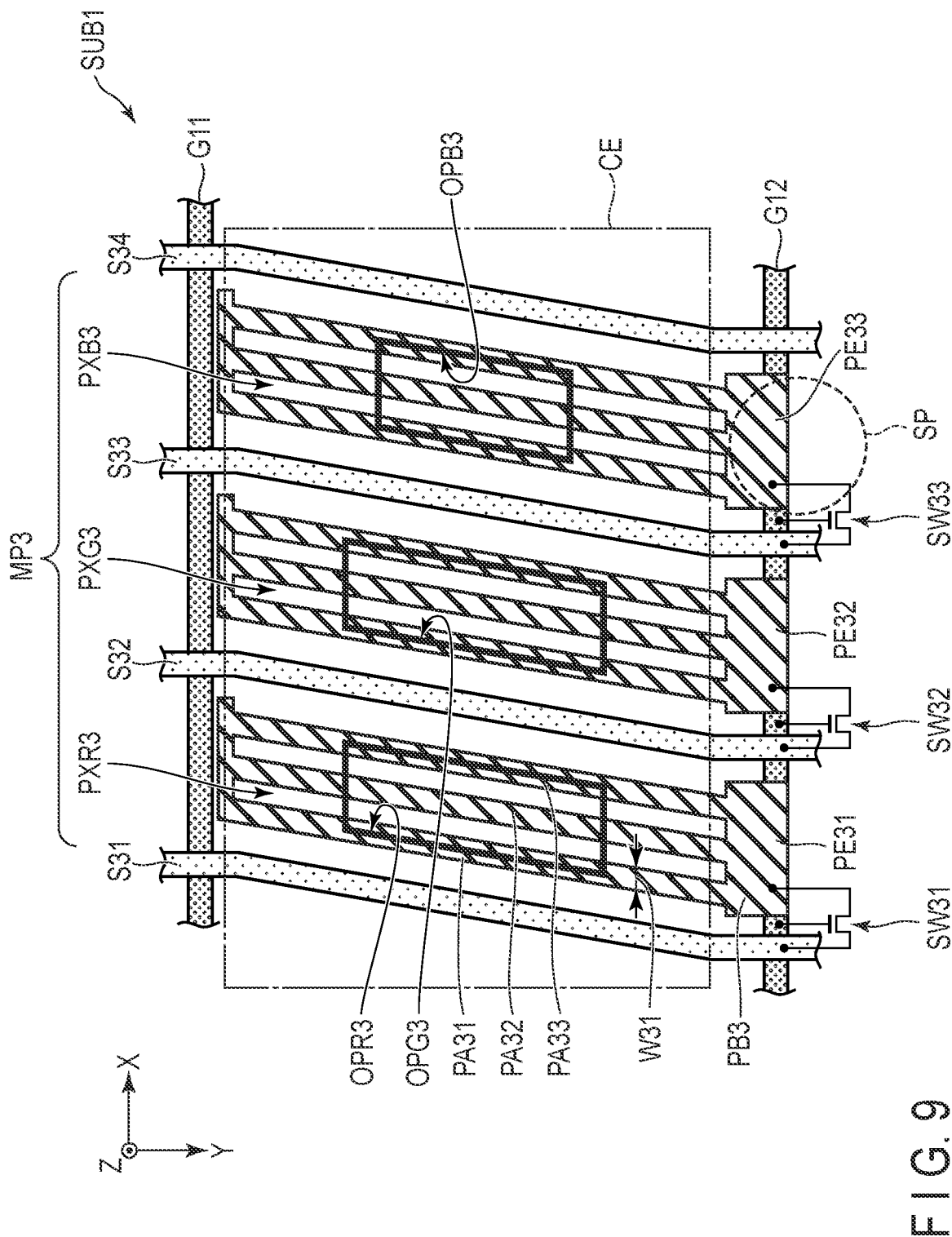
FIG. 9 is a plan view showing a third main pixel MP3.

FIG. 9 is a plan view showing the third main pixel MP3. As described with reference to FIG. 3, the first main pixel MP1 and the third main pixel MP3 are disposed in the same row along the first direction X, and share the scanning line G12.

The first substrate SUB1 comprises signal lines S31 to S34, switching elements SW31 to SW33, pixel electrodes PE31 to PE33, and a common electrode CE. The scanning lines G11 and G12 and the signal lines S31 to S34 cross one another.

The third main pixel MP3 comprises a red pixel PXR3, a green pixel PXG3 and a blue pixel PXB3 as sub-pixels. The red pixel PXR3 corresponds to a region surrounded by the scanning lines G11 and G12 and the signal lines S31 and S32. The green pixel PXG3 corresponds to a region surrounded by the scanning lines G11 and G12 and the signal lines S32 and S33. The blue pixel PXB3 corresponds to a region surrounded by the scanning lines G11 and G12 and the signal lines S33 and S34.

The red pixel PXR3 comprises the switching element SW31 electrically connected to the scanning line G12 and the signal line S31, and the pixel electrode PE31 electrically connected to the switching element SW31. That is, the pixel electrode PE11 of the first main pixel MP1 and the pixel electrode PE31 of the third main pixel MP3 are electrically connected to the same scanning line G12. The pixel electrode PE31 has a plurality of strip electrodes PA31 to PA33 and a contact portion PB3. The strip electrode PA31 is close to the signal line S31, the strip electrode PA33 is close to the signal line S32, and the strip electrode PA32 is located between the strip electrode PA31 and the strip electrode PA33. The strip electrodes PA31 to PA33 and the contact portion PB3 are integrally formed.

The strip electrodes PA31 to PA33 each have an equal width W31 along the first direction X. The width W31 is less than the width W11 but greater than the width W12 shown in FIG. 5. In addition, the width W31 is equal to the width W21 shown in FIG. 7. Here, the pixel electrode PE31 corresponds to a third pixel electrode, the strip electrode PA31 closest to the signal line S31 corresponds to a fifth strip electrode, and the strip electrode PA32 located at the center of the red pixel PXR3 corresponds to a sixth strip electrode.

The green pixel PXG3 comprises the switching element SW32 electrically connected to the scanning line G12 and the signal line S32, and the pixel electrode PE32 electrically connected to the switching element SW32.

The blue pixel PXB3 comprises the switching element SW33 electrically connected to the scanning line G12 and the signal line S33, and the pixel electrode PE33 electrically connected to the switching element SW33. The pixel electrodes PE32 and PE33 each have the same shape as the pixel electrode PE31.

As shown by a dashed-dotted line, the common electrode CE is disposed over the red pixel PXR3, the green pixel PXG3 and the blue pixel PXB3, and overlaps the pixel electrodes PE31 to PE33. The area of the pixel electrode PE31 overlapping the common electrode CE, the area of the pixel electrode PE32 overlapping the common electrode CE, and the area of the pixel electrode PE33 overlapping the common electrode CE are equal to one another.

In addition, the area of the pixel electrode PE31 overlapping the common electrode CE is equal to the area of the pixel electrode PE11 overlapping the common electrode CE in the first main pixel MP1 shown in FIG. 5.

In this third main pixel MP3, openings formed in the light-shielding layer are shown by solid lines. In planar view, an opening OPR3 corresponding to the red pixel PXR3 overlaps the pixel electrode PE31, an opening OPG3 corresponding to the green pixel PXG3 overlaps the pixel electrode PE32, and an opening OPB3 corresponding to the blue pixel PXB3 overlaps the pixel electrode PE33. In the example shown in FIG. 9, the size of the opening OPB3 is less than the size of the opening OPR3 and the size of the opening OPG3. Note that the size of the opening OPB3 may be equal to the size of the opening OPR3.

The size of the opening (third opening) OPR3 is greater than or equal to the size of the opening (first opening) OPR1 in the first main pixel MP1 shown in FIG. 5, and is less than the size of the opening (second opening) OPR2 in the second main pixel MP2 shown in FIG. 7.

In addition, the aspect ratio of the opening OPR1, the aspect ratio of the opening OPR2 and the aspect ratio of the opening OPR3 are equal to one another. Similarly, the aspect ratio of the opening OPG1, the aspect ratio of the opening OPG2 and the aspect ratio of the opening OPG3 are equal to one another. Furthermore, the aspect ratio of the opening OPB1, the aspect ratio of the opening OPB2 and the aspect ratio of the opening OPB3 are equal to one another.

When attention is focused on the red pixel PXR3, in planar view, the strip electrodes PA31 and PA33 each partially overlap the light-shielding layer, and the strip electrode PA32 is exposed from the opening (third opening) OPR3. In addition, the number of strip electrodes exposed form the opening OPR3 is greater than the number of strip electrodes exposed from the opening OPR1.

Figure 10:
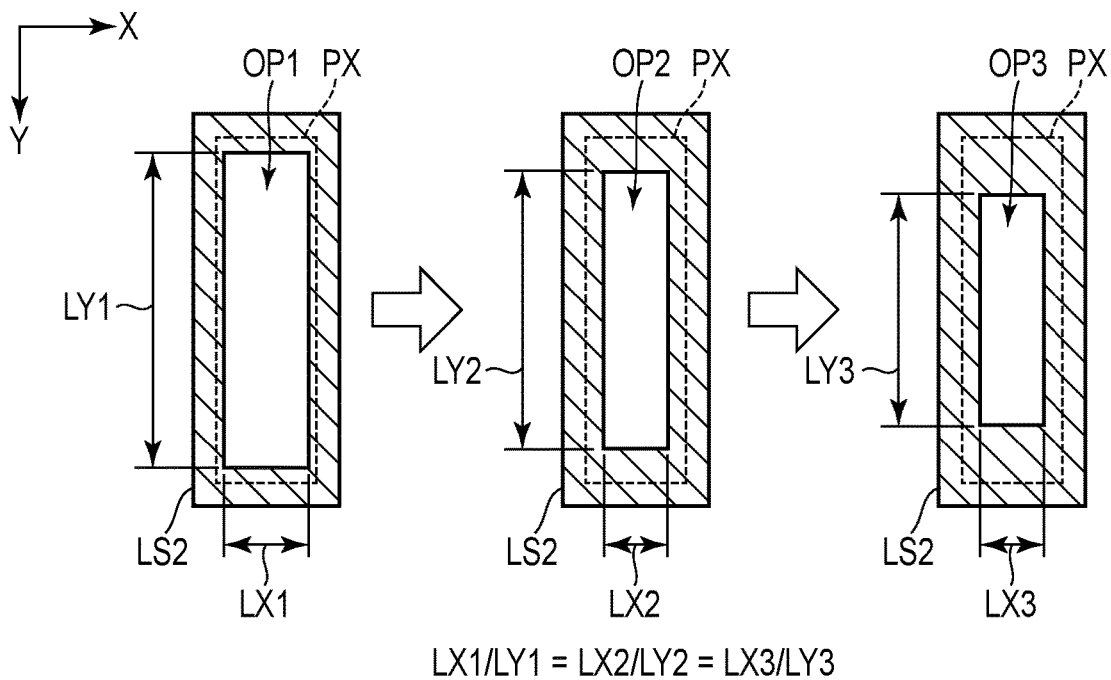
FIG. 10 is an illustration for explaining a technique of adjusting a maximum grayscale value in an outermost peripheral pixel.

FIG. 10 is an illustration for explaining a technique of adjusting a maximum grayscale value in an outermost peripheral pixel. The explanation here is based on the assumption that openings OP1 to OP3 of the light-shielding layer LS2 each are formed in a rectangular shape extending in the second direction Y. The opening OP1 on the left side of the drawing is applied to the sub-pixel PX of a standard pixel, and has a length LX1 in the first direction X and a length LY1 in the second direction Y. The opening OP2 at the center of the drawing is applied to the sub-pixel PX of an outermost peripheral pixel, and has a length LX2 in the first direction X and a length LY2 in the second direction Y. The length LX2 is less than the length LX1, and the length LY2 is less than the length LY1. The opening OP3 on the right side of the drawing is applied to the sub-pixel PX of an outermost peripheral pixel, and has a length LX3 in the first direction X and a length LY3 in the second direction Y. The length LX3 is less than the length LX2, and the length LY3 is less than the length LY2. The aspect ratio (LX1/LY1) of the opening OP1, the aspect ratio (LX2/LY2) of the opening OP2, and the aspect ratio (LX3/LY3) of the opening OP3 are equal to one another.

The sizes of the openings OP2 and OP3 applied to the sub-pixels PX of outermost peripheral pixels are less than the size of the opening OP1 applied to the sub-pixel PX of a standard pixel.

As described above, as the size of the opening OP decreases, the area contributing to display decreases, and the transmittance or the maximum grayscale value decreases. That is, it is possible to adjust the maximum grayscale value in the sub-pixel PX by adjusting the size of the opening OP formed in the light-shielding layer LS2.

Figure 11:
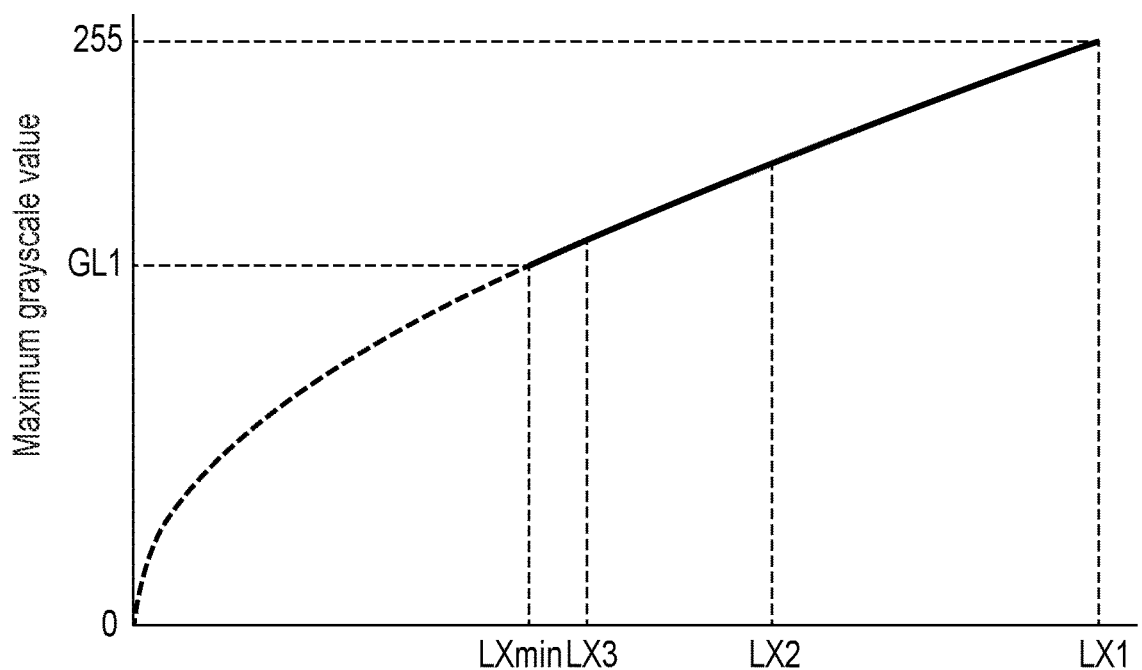
FIG. 11 is an illustration for explaining a maximum grayscale value which can be realized when the technique shown in FIG. 10 is applied.

FIG. 11 is an illustration for explaining a maximum grayscale value which can be realized when the technique shown in FIG. 10 is applied. The horizontal axis shows the length LX in the first direction X in the opening OP, and the vertical axis shows the maximum grayscale value in the sub-pixel PX. The aspect ratio of the opening OP is constant.

As the length LX decreases, the size of the opening OP decreases, and the maximum grayscale value decreases. In this technique, however, when the opening OP is formed in the light-shielding layer LS2, there is a resolution limit. That is, a length LXmin in the drawing corresponds to the lower limit of the length LX which can be formed. With the length LXmin, a maximum grayscale value GL1 is obtained. The maximum grayscale value GL1 is greater than a grayscale value of zero but less than a grayscale value of 255.

As described above, when the technique shown in FIG. 10 is applied, the maximum grayscale value GL1 corresponds to the lower limit of the realizable maximum grayscale value. In conclusion, a maximum grayscale value in a range shown by a dotted line in the drawing (a range from greater than or equal to a grayscale value of zero to less than the grayscale value GL1) cannot be realized by the technique shown in FIG. 10. In other words, it is possible to obtain a maximum grayscale value in a range from greater than or equal to the grayscale value GL1 to less than a grayscale value of 255 by reducing the size of the opening OP without changing the shape of the pixel electrode PE.

Figure 12:
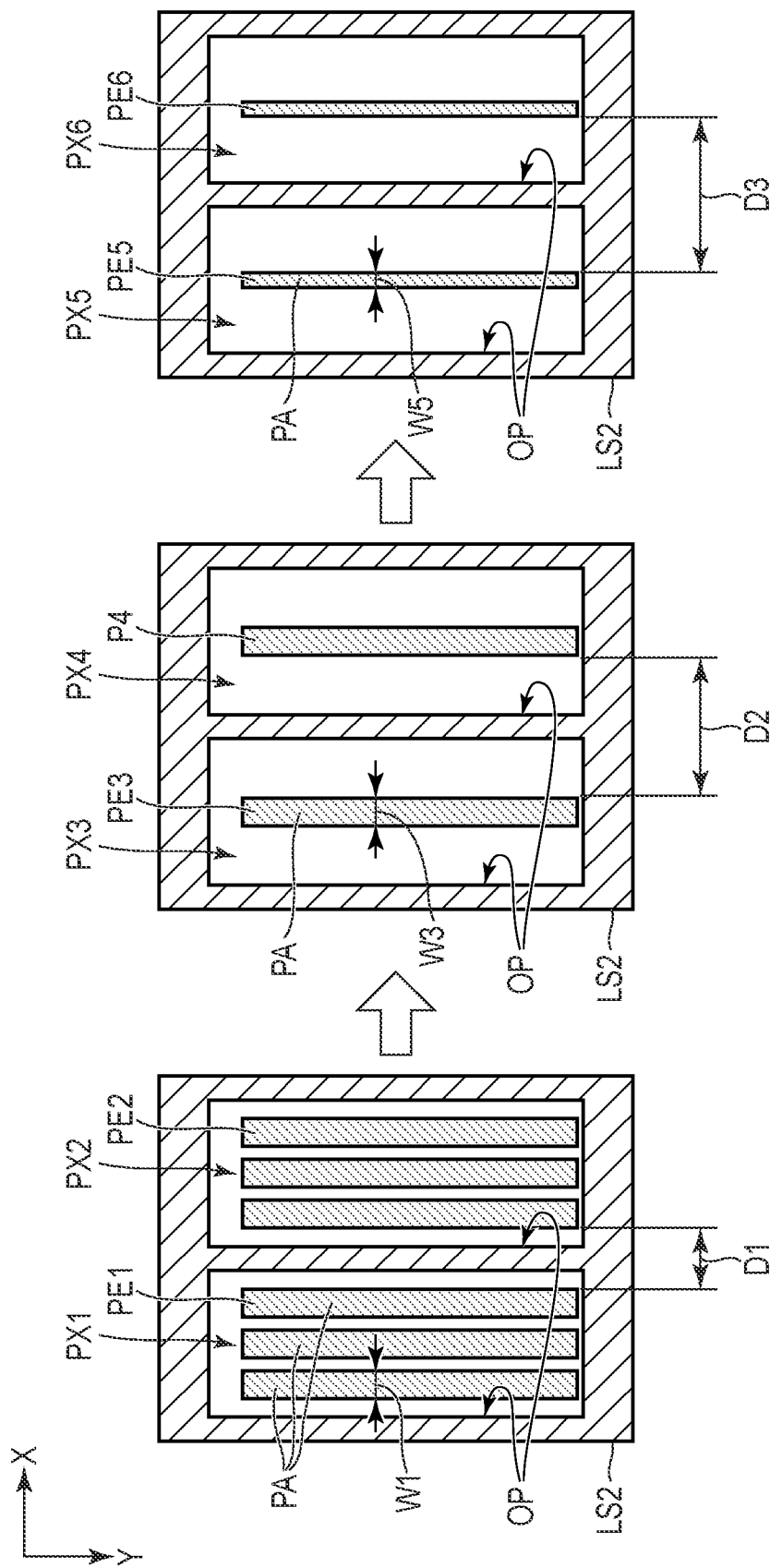
FIG. 12 is an illustration for explaining another technique of adjusting the maximum grayscale value in the outermost peripheral pixel.

FIG. 12 is an illustration for explaining another technique of adjusting the maximum grayscale value in the outermost peripheral pixel. The explanation here is based on the assumption that the size of the opening OP of the light-shielding layer LS2 is constant.

Pixels PX1 and PX2 on the left side of the drawing correspond to the sub-pixels of a standard pixel, and comprises pixel electrodes PE1 and PE2, respectively. The pixel electrodes PE1 and PE2 each comprise three strip electrodes PA. The pixel electrodes PE1 and PE2 exposed from the light-shielding layer LS2 are adjacent to each other with a distance D1 along the first direction X.

Pixels PX3 and PX4 at the center of the drawing correspond to the sub-pixels of an outermost peripheral pixel, and comprise pixel electrodes PE3 and PE4, respectively. The pixel electrodes PE3 and PE4 each comprise one strip electrode PA exposed from the light-shielding layer LS2. That is, the number of strip electrodes PA of the pixel electrode PE3 is less than the number of strip electrodes PA of the pixel electrode PE1. Note that a width W3 of the strip electrode PA of the pixel electrode PE3 is equal to the width W1 of the strip electrode PA of the pixel electrode PE1. The pixel electrodes PE3 and PE4 exposed from the light-shielding layer LS2 are adjacent to each other with a distance D2 along the first direction X. The distance D2 is greater than the distance D1.

Pixels PX5 and PX6 on the right side of the drawing correspond to the sub-pixels of an outermost peripheral pixel, and comprises pixel electrodes PE5 and PE6, respectively. The pixel electrodes PE5 and PE6 each comprise one strip electrode PA exposed from the light-shielding layer LS2. That is, the number of strip electrodes PA of the pixel electrode PE5 is equal to the number of strip electrodes PA of the pixel electrode PE3. A width W5 of the strip electrode PA of the pixel electrode PE5 is less than the width W3 of the strip electrode PA of the pixel electrode PE3. The pixel electrodes PE5 and PE6 exposed from the light-shielding layer LS2 are adjacent to each other with a distance D3 along the first direction X. The distance D3 is greater than the distance D2.

Note that the pixel electrodes PE3 to PE6 each may have three strip electrodes similarly to the pixel electrode PE1, but also in that case, the numbers of strip electrodes exposed from the light-shielding layer LS of them are one.

As described above, as the number of strip electrodes PA exposed from the light-shielding layer LS2 in each pixel electrode PE decreases, the distance D increases. In addition, when the number of strip electrodes PA provided in each pixel electrode PE is equal, as the width of the strip electrode PA exposed from the light-shielding layer LS2 decreases, the distance D increases. Especially in the FFS mode, as the installation area of the pixel electrode PE exposed from the light-shielding layer LS2 or the edge length of the strip electrode PA decreases, the area contributing to display decreases, and the transmittance or the maximum grayscale value decreases. That is, it is possible to adjust the maximum grayscale value in the sub-pixel PX by adjusting the number of strip electrodes PA exposed from the light-shielding layer LS2 and the width of the strip electrode PA exposed from the light-shielding layer LS2.

Figure 13:
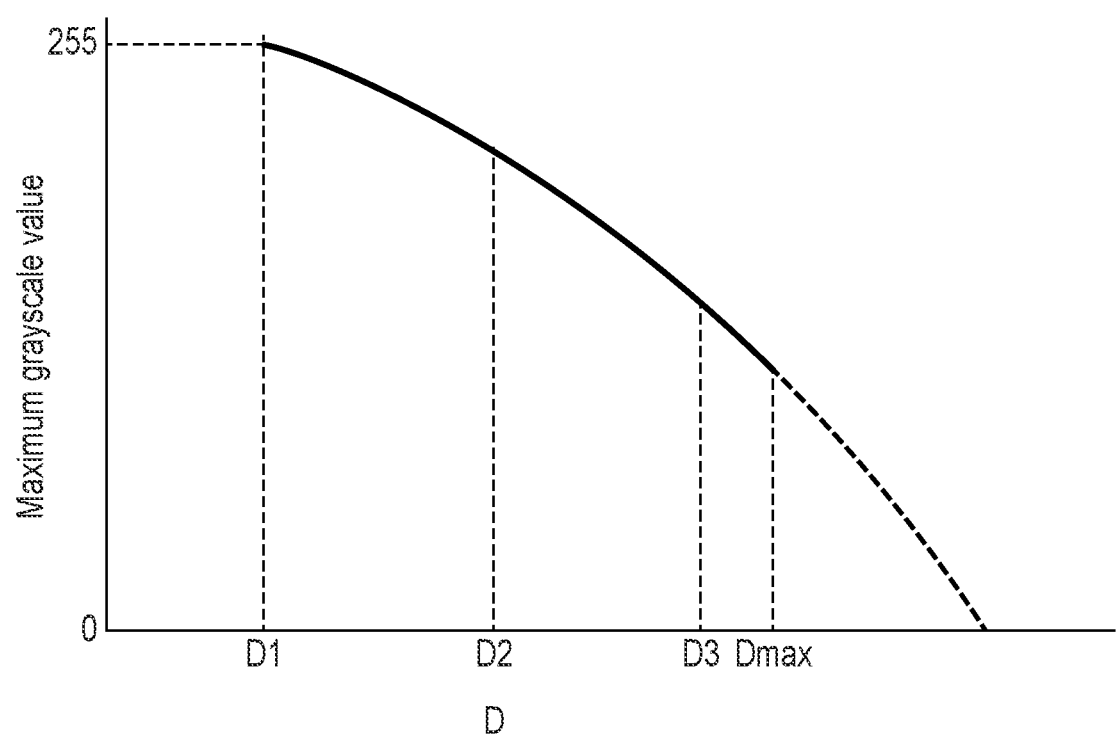
FIG. 13 is an illustration for explaining a maximum grayscale value which can be realized when the technique shown in FIG. 12 is applied.

FIG. 13 is an illustration for explaining a maximum grayscale value which can be realized when the technique shown in FIG. 12 is applied. The horizontal axis shows the distance D between the adjacent pixel electrodes, and the vertical axis shows the maximum grayscale value in the sub-pixel PX. As described with reference to FIG. 12, the distance D is the distance between the pixel electrodes exposed from the light-shielding layer LS2.

As the distance D increases, the maximum grayscale value decreases. In this technique, however, the distance D cannot be greater than the width in the first direction X of one sub-pixel PX. That is, a distance Dmax in the drawing corresponds to the upper limit of the distance D which can be formed. With the distance Dmax, a maximum grayscale value GL2 is obtained. The maximum grayscale value GL2 is greater than a grayscale value of zero but less than a grayscale value of 255.

As described above, when the technique shown in FIG. 12 is applied, the maximum grayscale value GL2 corresponds to the lower limit of the realizable maximum grayscale value. In conclusion, a maximum grayscale value in a range shown by a dotted line in the drawing (from greater than or equal to a grayscale value of zero to less than the grayscale value GL2) cannot be realized by the technique shown in FIG. 12. In other words, it is possible to obtain a maximum grayscale value in a range from greater than or equal to the grayscale value GL2 to less than a grayscale value of 255 by changing the shape of the pixel electrode PE without changing the shape of the opening OP (more specifically, reducing the number of strip electrodes and reducing the width of the strip electrode).

Therefore, in the present embodiment, the technique shown in FIG. 10 and the technique shown in FIG. 12 are combined so that a broader range of maximum grayscale values are realized and the outline DE is expressed more smoothly. More specifically, the technique shown in FIG. 10 is applied first. At this time, a maximum grayscale value less than that of a standard pixel is obtained by reducing the size of the opening formed in the light-shielding layer LS2 without changing the shape of the pixel electrode PE. Accordingly, a realizable maximum grayscale value such as that shown by the solid line in FIG. 11 is obtained. An outermost peripheral pixel obtained in this way corresponds to, for example, the third main pixel MP3 shown in FIGS. 3 and 9.

At a stage where the length LX of the opening decreases to a certain level (or at a stage where the length LX reaches the lower limit value LXmin), the technique shown in FIG. 12 is applied. At this time, without changing the shape of the opening, the number of strip electrodes PA exposed from the light-shielding layer LS2 is reduced to one, and the width of the strip electrode PA is reduced. Accordingly, a maximum grayscale value in a range such as that shown by the dotted line in FIG. 11 is obtained. An outermost peripheral pixel obtained in this way corresponds to, for example, the first main pixel MP1 shown in FIGS. 3 to 5.

Therefore, as compared with when the maximum grayscale value is adjusted only by one technique, a broader range of maximum grayscale values can be realized, and the round outline DE can be expressed more smoothly.

In addition, also when the shape of the pixel electrode PE disposed in the outermost peripheral pixel is different from the shape of the pixel electrode PE disposed in the standard pixel, the area of the pixel electrode PE overlapping the common electrode CE is constant over the entire region of the display region DA. Therefore, in the entire region of the display region DA, the difference in the capacitance CS of the pixel PX is reduced, and display trouble due to the capacitance difference is improved.

As described above, according to the present embodiment, a display device capable of suppressing degradation of display quality can be provided.

The present invention is not limited to the embodiment described above but the constituent elements of the invention can be modified in various manners without departing from the spirit and scope of the invention. Various aspects of the invention can also be extracted from any appropriate combination of a plurality of constituent elements disclosed in the embodiment. For example, some of all constituent elements in the embodiment may be deleted. Furthermore, constituent elements described in different embodiments may be combined arbitrarily.

What is claimed is:
1. A display device comprising:
a first substrate;
a scanning line which extends in a first direction on the first substrate;
a signal line which extends in a second direction crossing the the first direction on the first substrate;
a lower electrode disposed over a display region;
an inorganic insulating film disposed on the lower electrode;
a first upper electrode disposed on the inorganic insulating film in a first main pixel at an outermost periphery of the display region, which includes a first strip electrode and a second strip electrode;
a second upper electrode disposed on the inorganic insulating film in a second main pixel located more toward an inside than the first main pixel of the display region, which includes a third strip electrode and a fourth strip electrode;
a third upper electrode disposed on the inorganic insulating film in a third main pixel at the outermost periphery of the display region, which includes a fifth strip electrode and a sixth strip electrode;
a second substrate comprising a light-shielding layer overlapping the first strip electrode; and
a liquid crystal layer disposed between the first substrate and the second substrate, wherein
the first upper electrode and the second upper electrode are electrically connected to the signal line,
the first upper electrode and the third upper electrode are electrically connected to the scanning line,
the light-shielding layer includes a first quadrilateral opening that exposes the second strip electrode, a second quadrilateral opening that exposes the third strip electrode and the fourth strip electrode, and a third quadrilateral opening overlapping the third upper electrode, a size of the third quadrilateral opening is less than a size of the second quadrilateral opening, and is greater than or equal to a size of the first quadrilateral opening,
an aspect ratio of the first quadrilateral opening is equal to an aspect ratio of the second quadrilateral opening, and
the aspect ratio is expressed as a length along the first direction/a length along the second direction.

2. The display device of claim 1, wherein the size of the first quadrilateral opening is less than the size of the second quadrilateral opening.

3. The display device of claim 1, wherein a width of the third strip electrode is equal to a width of the fourth strip electrode, is less than a width of the first strip electrode, and is greater than a width of the second strip electrode.

4. The display device of claim 1, wherein an area of the first upper electrode overlapping the lower electrode is equal to an area of the second upper electrode overlapping the lower electrode.

5. The display device of claim 1, wherein a number of the second strip electrodes exposed from the first quadrilateral opening is one.

6. The display device of claim 1, wherein a width of the second strip electrode is less than a width of the first strip electrode, and
a width of the fifth strip electrode and a width of the sixth strip electrode are equal to a width of the third strip electrode.

7. A display device comprising:
a first substrate;
a scanning line which extends in a first direction on the first substrate;
a signal line which extends in a second direction crossing the the first direction on the first substrate;
a lower electrode disposed over a display region;
an inorganic insulating film disposed on the lower electrode;
a first upper electrode disposed on the inorganic insulating film in a first main pixel at an outermost periphery of the display region, which includes a first strip electrode and a second strip electrode;
a second upper electrode disposed on the inorganic insulating film in a second main pixel located more toward an inside than the first main pixel of the display region, which includes a third strip electrode and a fourth strip electrode;
a third upper electrode disposed on the inorganic insulating film in a third main pixel at the outermost periphery of the display region, which includes a fifth strip electrode and a sixth strip electrode;
a second substrate comprising a light-shielding layer overlapping the first strip electrode and a peripheral light-shielding layer integrally formed with the light-shielding layer; and
a liquid crystal layer disposed between the first substrate and the second substrate, wherein
the first upper electrode and the second upper electrode are electrically connected to the signal line,
the first upper electrode and the third upper electrode are electrically connected to the scanning line,
the light-shielding layer includes a first quadrilateral opening that exposes the second strip electrode, a second quadrilateral opening that exposes the third strip electrode and the fourth strip electrode, and a third quadrilateral opening overlapping the third upper electrode,
a size of the third quadrilateral opening is less than a size of the second quadrilateral opening, and is greater than or equal to a size of the first quadrilateral opening,
two sides of the first main pixel are adjacent to the peripheral light-shielding layer,
one side of the third main pixel is adjacent to the peripheral light-shielding layer,
an aspect ratio of the first quadrilateral opening is equal to an aspect ratio of the second quadrilateral opening, and
the aspect ratio is expressed as a length along the first direction/a length along the second direction.

8. The display device of claim 7, wherein the size of the first quadrilateral opening is less than the size of the second quadrilateral opening.

9. The display device of claim 7, wherein a width of the third strip electrode is equal to a width of the fourth strip electrode, is less than a width of the first strip electrode, and is greater than a width of the second strip electrode.

10. The display device of claim 7, wherein an area of the first upper electrode overlapping the lower electrode is equal to an area of the third upper electrode overlapping the lower electrode.

11. The display device of claim 7, wherein a number of the second strip electrodes exposed from the first quadrilateral opening is one.

12. The display device of claim 7, wherein a width of the second strip electrode is less than a width of the first strip electrode, and a width of the fifth strip electrode and a width of the sixth strip electrode are equal to a width of the third strip electrode.

13. The display device of claim 1, wherein the shape of the first quadrilateral opening and the shape of the second quadrilateral opening are similar to each other.

14. The display device of claim 7, wherein the shape of the first quadrilateral opening and the shape of the second quadrilateral opening are similar to each other.

* * * * *